(12) United States Patent
Eungard (10) Patent No.: US 7,044,474 B2
(45) Date of Patent: May 16, 2006

(54) WIPER SEAL METHOD AND APPARATUS

(75) Inventor: William C. Eungard, Waterford, WI (US)

(73) Assignee: SPX Dock Products, Inc., Sussex, WI (US)

( * ) Notice: Subject to any disclaimer, the term of this patent is extended or adjusted under 35 U.S.C. 154(b) by 0 days.

(21) Appl. No.: 10/270,547

(22) Filed: Oct. 16, 2002

(65) Prior Publication Data

US 2004/0075223 A1    Apr. 22, 2004

(51) Int. Cl.
*E04H 14/00* (2006.01)

(52) U.S. Cl. .................. 277/650; 277/921; 52/173.2

(58) Field of Classification Search ............... 277/640, 277/650, 921; 52/173.2, 2.12
See application file for complete search history.

(56) References Cited

U.S. PATENT DOCUMENTS

| | | | | |
|---|---|---|---|---|
| 3,638,667 | A | * | 2/1972 | Frommelt et al. ......... 52/173.2 |
| 4,601,142 | A | * | 7/1986 | Frommelt .................. 52/173.2 |
| 4,638,612 | A | * | 1/1987 | Bennett ..................... 52/173.2 |
| 4,711,059 | A | * | 12/1987 | Layne ....................... 52/173.2 |
| 4,799,341 | A | * | 1/1989 | Frommelt et al. ......... 52/173.2 |
| 4,885,881 | A | * | 12/1989 | Lenz ......................... 52/173.2 |
| 5,282,342 | A | | 2/1994 | Brockman et al. |
| 5,473,846 | A | | 12/1995 | Giuliani et al. |
| 5,675,945 | A | | 10/1997 | Giuliani et al. |
| 5,996,291 | A | * | 12/1999 | Styba et al. ............... 52/173.2 |
| 6,205,721 | B1 | | 3/2001 | Ashelin et al. |
| 6,233,885 | B1 | | 5/2001 | Hoffmann et al. |
| 6,272,799 | B1 | * | 8/2001 | Ashelin et al. ............ 52/173.2 |
| 6,381,910 | B1 | * | 5/2002 | Katz .......................... 52/211 |

\* cited by examiner

*Primary Examiner*—Alison K. Pickard
(74) *Attorney, Agent, or Firm*—Baker & Hostetler LLP (57) ABSTRACT

A wiper seal apparatus for forming a weather seal between a vehicle and a loading dock is provided. The wiper seal apparatus includes a seal member which bends toward a support mounted on a warehouse wall when deflected toward the wall, and applies a pressure on the top surface of a parked vehicle to form a seal.

18 Claims, 5 Drawing Sheets

WIPER SEAL METHOD AND APPARATUS

FIELD OF THE INVENTION

The present invention relates generally to loading docks. More particularly, the present invention relates to an apparatus and method for sheltering the interior of buildings from precipitation collected on the top surface of a vehicle parked at a loading dock.

BACKGROUND OF THE INVENTION

When a vehicle such as a semi-trailer truck has been in a rain or snowstorm, it often collects water (and sometimes slush, snow or ice) on the top of the surface of the trailer. When the trailer backs up to a loading dock, there is a potential for this collection of water (and sometimes slush, snow or ice) to flow over the leading edge of the top of the trailer into the loading dock area. A similar effect can occur with a truck parked at a dock when a rain or snowstorm begins, particularly if the parking area is pitched toward the dock. In such a case, all or nearly all the rain or melting snow on the top surface of the trailer will run towards the lowest part of the trailer, which, in this example, is the leading edge of the truck adjacent the dock.

There is a need for an apparatus and method that can provide adequate protection of the loading dock area from precipitation collected on the top surface of a vehicle. There is also a need for such an apparatus and method, which is durable, i.e. designed to minimize abrasion and wear of the apparatus. It is also desirable to provide an apparatus and method for the simple and cost effective replacement of apparatus materials that are eventually damaged from normal usage.

SUMMARY OF THE INVENTION

The foregoing needs are met, to a great extent, by the present invention, wherein in one aspect an apparatus having a resilient pad, a support, and a stiff backing member is provided. The stiff backing member prevents a portion of the seal member from completely rotating back toward the building wall.

In another aspect of the invention, the stiff backing member is integral with the support.

In yet another aspect of the invention, the apparatus further includes a hinge at the top-portion of the seal member. The hinge allows the seal to move vertically and rotate in a forward direction, away from the support and the building wall.

In yet another aspect of the invention, the apparatus further may include one or two wear- and weather-resistant fabric exteriors the outer one being removable and replaceable.

In yet another aspect of the invention, the sealing apparatus also includes drain holes for the removal of moisture from the interior of the seal.

In yet a further aspect of the invention, a method is provided for protecting a dock from precipitation, on the top of a parked vehicle, flowing into the dock.

There has thus been outlined, rather broadly, the more important features of the invention in order that the detailed description thereof that follows may be better understood, and in order that the present contribution to the art may be better appreciated. There are, of course, additional features of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION OF PREFERRED EMBODIMENTS OF THE INVENTION

The present invention provides an apparatus suitable for sheltering loading docks and personnel working thereon from precipitation flowing into the loading dock area from the top of a vehicle parked at the loading dock. Generally, sheltering the dock is accomplished by providing a wiper seal apparatus having a seal member, a support extending from and sometimes connected to the warehouse wall, and a stiff backing member. The wiper seal apparatus is deflectable from a first position in the path of a vehicle entering the parking area to a second, engaged, position wherein the wiper seal apparatus exerts a pressure against the top surface of the vehicle parked in the parking area. Preferably, the wiper seal apparatus includes a top-side hinge permitting the seal apparatus to rotate away from the dock, at the hinge portion, as the truck leaves the parking area.

Although the wiper seal apparatus is particularly well-suited for use with a loading dock on a warehouse or the like, the teachings of the instant invention are not limited to any particular environment of use; rather, for example, the invention can be employed with virtually any structure adjacent a parking area where the creation of a seal with a top surface of a vehicle is desired.

Figure 1:
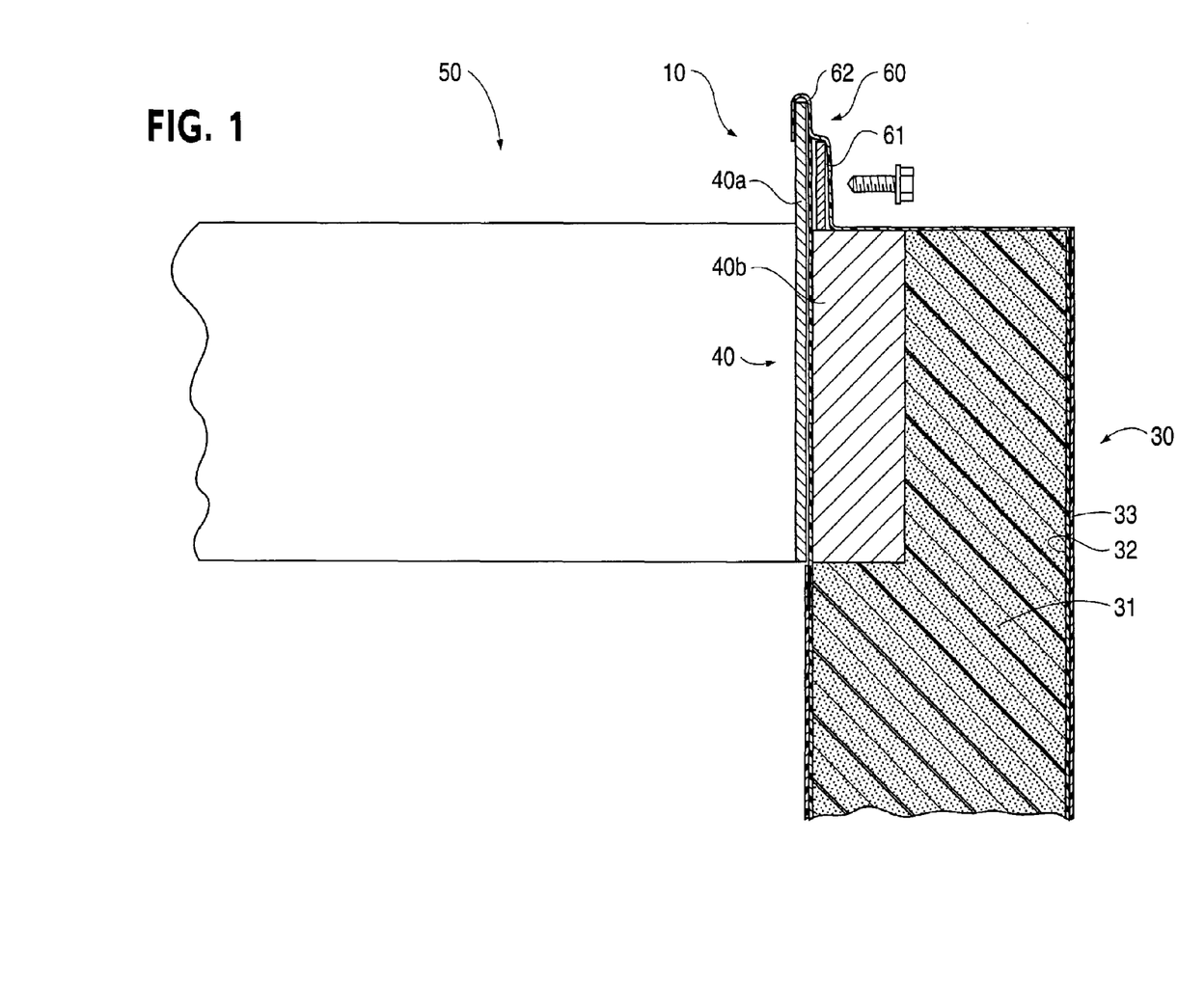
FIG. 1 is a side view of a wiper seal apparatus in accordance with one embodiment of the invention.

Referring now to the figures, wherein like reference numerals indicate like elements, FIG. 1 illustrates a wiper seal apparatus 10 in accordance with an embodiment of the invention. The wiper seal apparatus 10 includes a seal member 30, a stiff backing member 40, and a support 50. The wiper seal apparatus 10 also preferably includes a hinge portion 60.

The seal member 30 includes a resilient pad 31, which is optionally wrapped in at least one weather- and/or wearresistant cover. The resilient pad 31 is wrapped in two such covers, the inner cover 32 and the outer cover 33. The seal member 30 can also optionally include a seal member portion 40b, of a stiff backing member 40.

The resilient pad 31 can be constructed from any material which, when deflected by a vehicle backing toward a building wall, can exert a pressure on the top of the vehicle. In some embodiments, the material is also deformable, or compressible, such that the bottom end 35 (FIG. 4) of the resilient pad 31 can conform to the top surface of the vehicle. Appropriate materials include, but are not limited to foam, plastic, elastomer, and/or rubber materials. In some embodiments, the material is a high density foam, such as polyurethane foam having a density ranging from about 0.95 to about 1.60 lb/ft$^3$.

The dimensions of the resilient pad 31 are preferably chosen so that in the engaged position (illustrated in FIG. 4), the wiper seal apparatus 10 can form a seal to protect the loading dock area from precipitation sliding down the top surface of the vehicle. The width of the resilient pad 31, therefore, is typically at least as wide as the top of the vehicle. The height and depth of the resilient pad 31 can depend on one another and the material from which the pad is made. Specifically, the combination of variables (height, depth, and material) is preferably selected to permit the resilient pad 31 to flex in response to the movement of a parking vehicle sufficiently to prevent rapid deterioration of the wiper seal apparatus 10, but not so much such that a seal is not formed. More specifically, the height is typically chosen to permit the resilient pad 31 to contact the top surface of a vehicle backing into a loading dock, but also to flex sufficiently to provide a sealing force on the top surface of a vehicle, when a vehicle backs toward the building wall. Preferably, the height is also chosen so that snow and ice, which may have accumulated on the vehicle, does not cause the resilient pad 31 to compress underneath the support 50 sufficiently to effect a damaging pressure on the support 50. The depth, or thickness, of the resilient pad 31 is typically chosen so that an appropriate force can be applied to the top surface of the vehicle to effect a seal, with little or no damage to the wiper seal apparatus 10. Specifically, a thickness that is too large may result in rapid deterioration of the resilient pad 31, and/or the inner and outer covers 32, 33; a thickness that is too thin will be too flexible, and an effective seal may not form.

Typical dimensions of resilient pads made from polyurethane foam, designed to engage trucks ranging in height from 12'9" to 13'6" that back into loading docks wherein the wall support frame is about 175" off the ground, range from about 12" to about 36" for the height, from about 8' to about 12' for the width, and from 1" to about 10" for the depth.

Figure 3:
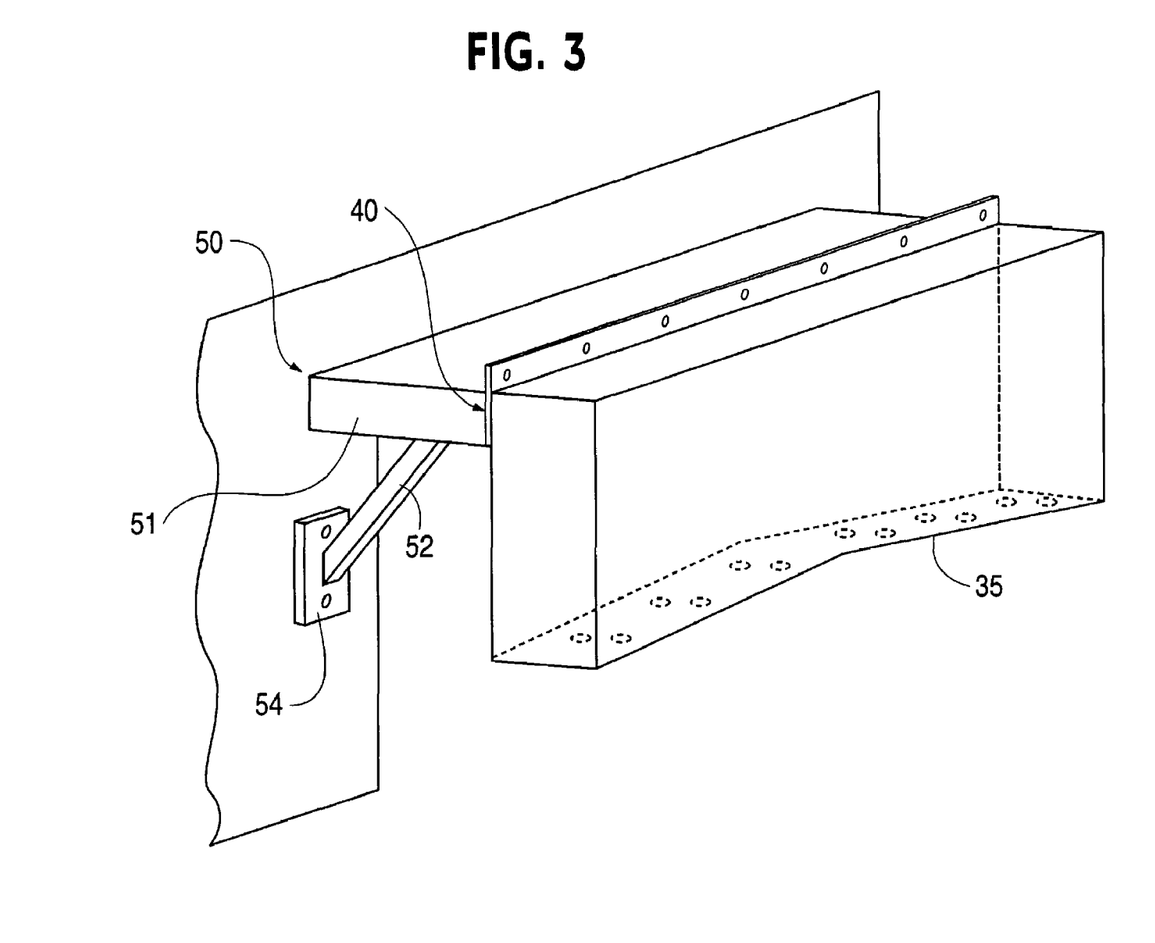
FIG. 3 is a perspective view of another embodiment of the wiper seal apparatus.

The shape of the resilient pad 31 is similarly preferably chosen so that the wiper seal apparatus 10 forms a seal to protect the loading dock area from precipitation sliding down the top surface of the vehicle. Thus, as is apparent for the teachings herein, the side and front profile of the resilient pad 31 are typically, but not necessarily rectangular. As shown in FIG. 3, non-limiting examples of additional possible shapes include without limitation, a resilient pad 31 with a bottom end 35 formed in the shape of an arch (upright or inverted) or a V (upright or inverted). Similarly, the side profile may also be formed in the shape of an arch (upright or inverted) or a V (upright or inverted).

The resilient pad 31 may be encased in one or more fabric covers 32, 33. The fabric covers 32,33 are intended to impart wear-resistance and/or weather-resistance to the wiper seal apparatus 10, rendering the wiper seal apparatus 10 more durable. The fabric covers may be provided by any material suitable for imparting weather- and/or wear-resistance, and are preferably also pliable so that the covers can conform to the top surface of the vehicle. Non-limiting examples of suitable materials include neoprene, vinyl, and vinyl- or hyaplon-coated flexible cloth. In some embodiments, the inner cover 32 is chosen primarily for its water-proof characteristics, and may be, for example 16 oz. hypalon material, whereas the outer cover 33 is chosen primarily for its wear-resistance characteristics, and is a stiffer, more durable vinyl material.

Figure 2:
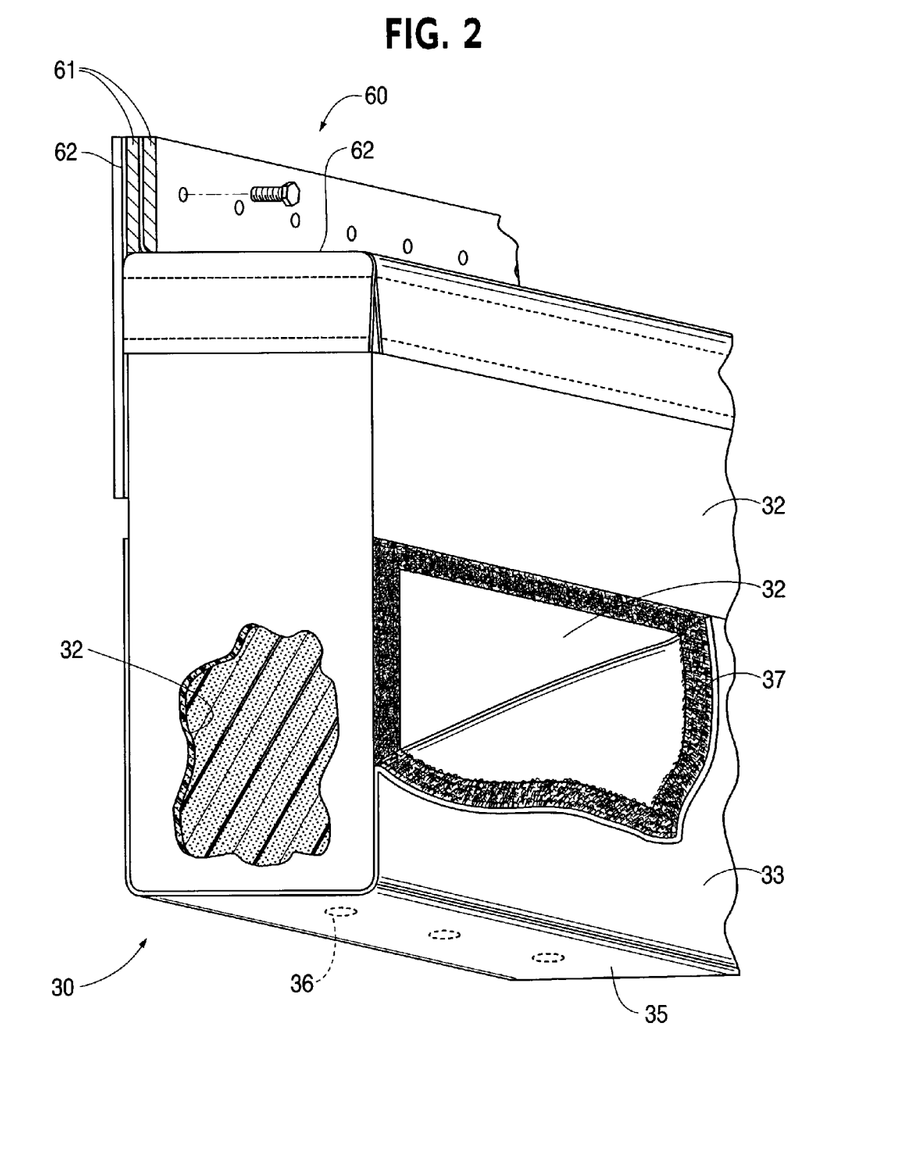
FIG. 2 is a perspective view of a wiper seal in accordance with another embodiment of the invention with a cut-away to illustrate the internal composition of the seal.

The fabric covers 32,33 may fully encase all sides of the resilient pad 31, or they may only partially encase the resilient pad 31. In the illustrated embodiment, the inner cover 32, because it is primarily intended to render the resilient pad 31 water-proof, fully encases the resilient pad 31. The outer cover 33, however, because it is primarily intended to be a sacrificial layer intended to impart durability to the wiper seal apparatus, covers only sides of the resilient pad 31 that come in frictional contact (and therefore may wear more rapidly than other portions of the resilient pad 31) with the top surface of the vehicle. Although the outer cover 33 may be attached in any manner to the wiper seal apparatus 10, it is preferably attached for easy replacement, such as with zippers, snaps, buttons, or hook and loop fastening material known as VELCRO®. FIG. 2 illustrates an embodiment having a outer cover 33 attaches to the inner cover 32 by velcro 37.

In another aspect of the invention, the fabric covers 32, 33 include at least one drain hole 36 to drain moisture and liquids. In some embodiments including two fabric covers 32, 33 only the inner, or base, fabric cover 32 includes drain holes. In such embodiments, the drain holes 36 are located at the bottom end 35 of the seal member 30, within the inner cover 32 and are beneath, but covered by, the outer cover 33.

Figure 4:
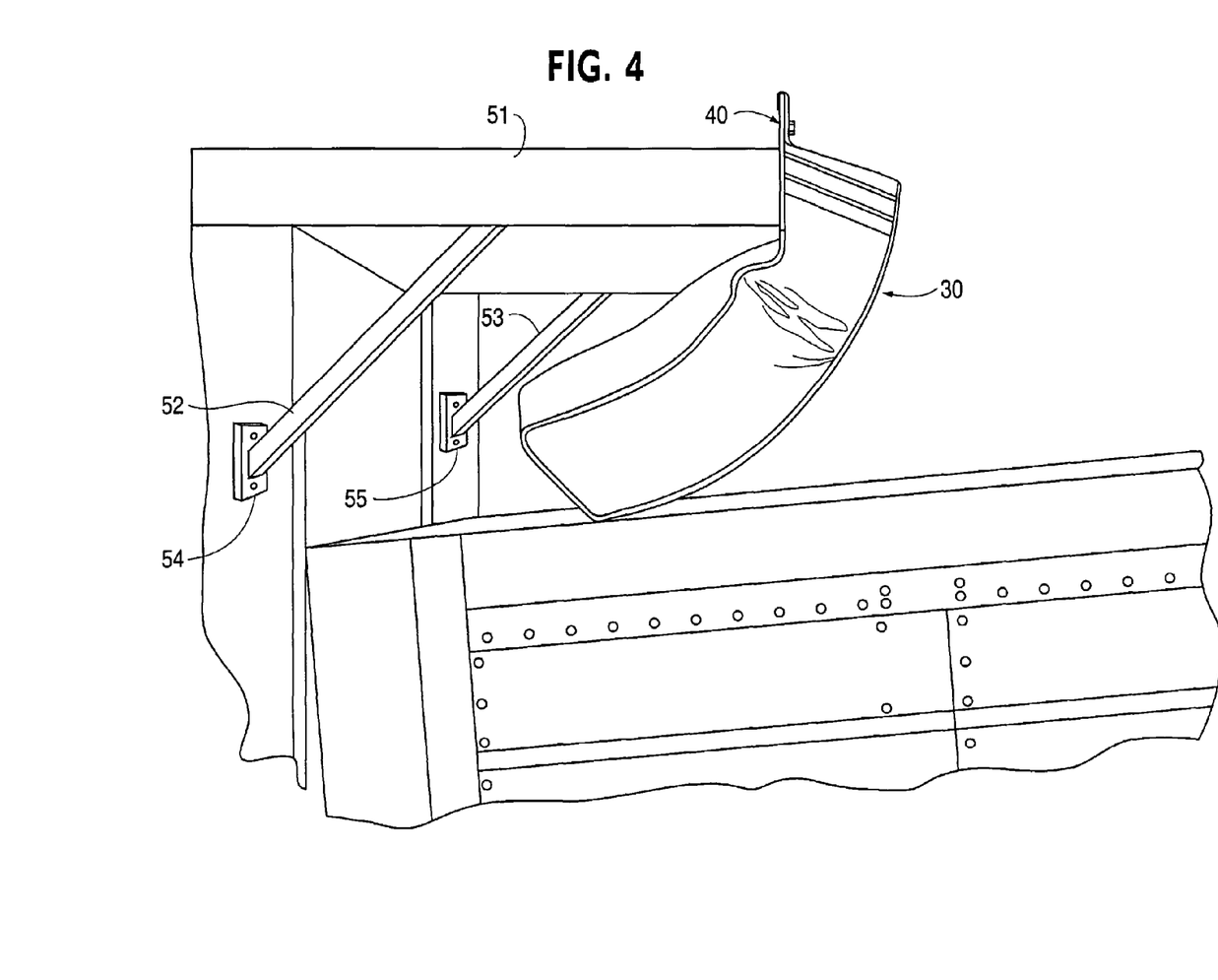
FIG. 4 is a side view of the wiper seal of FIG. 2 in the engaged position.

As illustrated in FIG. 4, the stiff backing member 40 prevents a portion of the seal member 30 from rotating fully toward the warehouse wall, and causes at least some of the backward travel of the resilient pad 31 to be a result of a bending, rather than a swinging action. This bending action enables the resilient pad 31 to impart a force onto the top surface of a vehicle, creating a seal. The stiff backing member 40 is provided by any suitably rigid material, such as metal, wood, fiberglass, or stiff plastic.

The stiff backing member 40 may be integral with the support 50, incorporated into the resilient pad 31, an independent piece, or a combination thereof. In embodiments where a stiff backing member 40 is integrated into the support 50; the front of the support and stiff backing member are coextensive. FIG. 1 exemplifies a combination stiff backing member 40. In that embodiment, the stiff backing member includes a seal member portion 40b incorporated into the resilient pad 31 and headframe portion 40a attached to the support 50. The seal member portion 40b, which may be a 2"×6" piece of wood as long as the resilient pad 31 is wide, replaces a portion of the resilient pad 31. The wood seal member portion 40b of the stiff backing member may be adhesively, or otherwise attached to the resilient pad 31, or may be held in place merely by a fabric inner cover 32 encasing the resilient pad 31 and wood seal member portion 40b. The headframe portion 40a, which can be an 11 gauge steel head frame stop plate, is attached to the support 50 by any means known in the art.

The height of the stiff backing member 40 is chosen to be sufficient to cause the resilient pad 31 to bend and impart a force on the top surface of a vehicle, as the vehicle engages the wiper seal apparatus 10. The preferred minimum thickness depends on the material used for the stiff backing member 40, but should be sufficient so that the stiff backing member 40 is durable, and does not break or rapidly deteriorate as force is applied to it when a vehicle engages the wiper seal apparatus 10. The thickness should also such that the stiff backing member 40 causes a bending motion in the resilient pad 31 when a vehicle engages the seal member 30. The width of the stiff backing member 40 is preferably chosen to be wide enough so that it causes the entire width of the resilient pad 31 covering the top surface of a vehicle to bend when a vehicle backs into a loading dock. Typical dimensions for a metal stiff backing member range from about 4" to about 10" for the height, from about 8' to about 12' for the width, and from about 1/16" to about 1.5" for the thickness.

The seal member 30 is attached to a support 50, so that the resilient pad can bend toward the warehouse wall as a vehicle backs into the loading dock area. In some embodiments, the support 50 is a stationary support, i.e. it remains stationary when a vehicle backs into the loading dock and engages the wiper seal apparatus 10. As shown in FIG. 4, the support 50 includes a headframe 51, which may be fastened to the loading dock wall with the assistance of side posts 52, 53 and brackets 54, 55. The headframe 51 may be a unitary piece, or may be made of multiple pieces.

The support 50 is preferably made from a material or materials, such as an appropriate wood, metal, or concrete that can withstand the force imparted upon it, as a vehicle engages the resilient pad 31, in a durable fashion, i.e. the support 50 does not break or require frequent replacement due to wear and tear.

Optionally, a fabric such as vinyl or hypalon coated flexible cloth or metal sheeting such as coated steel can be secured to the support frame by bolts or other conventional fasteners to create a further barrier preventing weather from entering the dock area.

The headframe 51 preferably extends sufficiently far from the warehouse dock to permit the resilient pad 31 to bend toward the warehouse wall thereby creating a seal with the top surface of the vehicle, but not so far as to increase the cost and difficulty of securing the support from being pulled down as the vehicle engages the seal member 30 thereby applying a downward force on the support 50. For this reason, the support 50 is preferably adapted to remain substantially stationary when a vehicle backs into the parking area.

In some embodiments, the distance of the headframe 51 from the building wall ranges from about 18" to about 96".

The headframe 51 is positioned above the doorway on the loading dock wall, at a height which permits the resilient pad 31 to contact the top surface of a vehicle and bend backward to create a seal. The height of the headframe 51 can therefore depend on the height of the resilient pad 31. In a typical embodiment, the height from the top of the headframe 51 to the ground ranges from about 164" to about 188".

Figure 5:
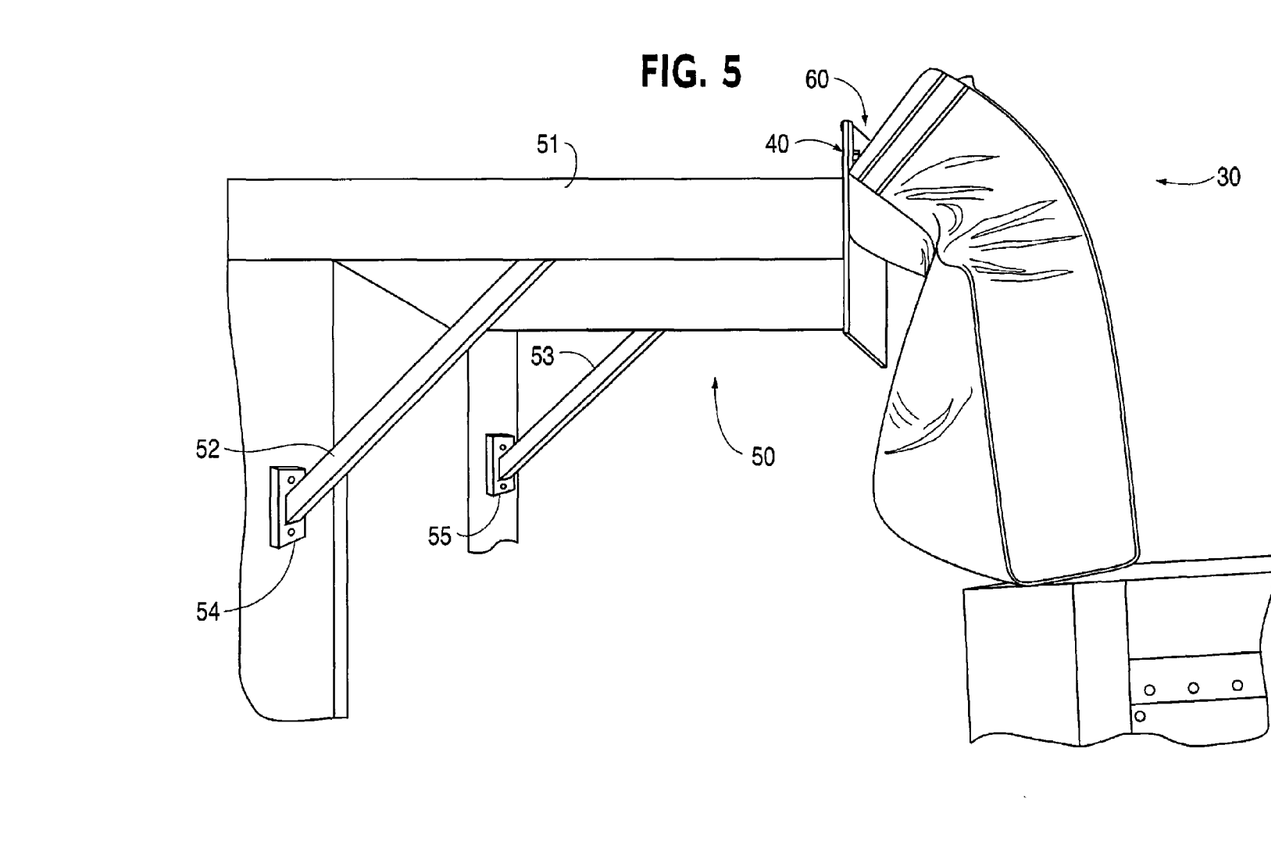
FIG. 5 is a side view of the wiper seal of FIG. 2 in a disengaged position.

The wiper seal apparatus 10 optionally includes a hinge portion 60. As shown in FIG. 5, the hinge portion 60 permits the seal member 30 to rotate away from the building wall as the vehicle leaves the dock and the seal member 30 disengages from the top surface of the vehicle. Preferably, the hinge portion 60 also permits at least some vertical movement. Among other things, the vertical movement can alleviate wear and tear on the wiper seal apparatus 10, which otherwise might experience a tearing pulling force as trucks enter or leave the loading dock. Although the illustrated embodiments depict a single hinge portion 60 extending along the entire width of the seal member 30, a person of ordinary skill will recognize from the instant teachings that a shorter hinge may be used, or alternatively that multiple hinges of suitable length might likewise be appropriate.

The hinge portion 60 can be an extension of the first fabric inner cover 32, an extension of the second fabric outer cover 33, or both, or can be one or more fabric pieces, independent of the fabric covers 32, 33, attached directly to the resilient pad 31 and/or to one or more of the fabric covers 32, 33. The hinge portion 60 can also optionally include one or more defining strips 61, made from any suitable material, such as an additional or thicker piece of material, fiberglass, plastic, wood, or metal, to further define the hinge portion 60. In the embodiment illustrated in FIG. 2, the hinge portion 60 includes a fabric portion 62 attached by a hook and loop fastener to the first fabric inner cover 32, and a single steel defining strip 61 extending the width of the resilient pad 31. As a person of ordinary skill can appreciate from the teachings herein, the fabric portion 62 can be attached to the seal member 30 by any means, including glue, staples, snaps, buttons, and zippers. The fabric portion 62 is, however, preferably attached for easy replacement, such as by the hook and loop fastening system illustrated in FIG. 2. In one embodiment, the defining strip 61 is attached to the fabric portion 62 by any known means, for example it can be riveted, attached by bolts, screws, or epoxy adhesives. In the embodiment illustrated in FIG. 2, there are two defining strips 61. The defining strips 61 are held to the fabric portion 62 by sandwiching the fabric portion 62 between the defining strips 61 and fastening the strips together through the fabric by any known means, for example they can be clinched, riveted, bolted, screwed, or spot welded. If the defining strips 61 are made from steel with a galvanized coating, clinching is preferred because it does not degrade the protective galvanized coating of the steel strips.

The seal member 30 may be attached to the support by any means known to those of ordinary skill in the art. In the illustrated embodiments, the seal member 30 is attached to the support 50 via the hinge portion 60 and the stiff backing member 40. As shown, the stiff backing member 40, which is connected to the headframe 51, extends upwardly, above the top of the headframe 51. The hinge portion 60 is then attached to the stiff backing member 40, through the defining strip 61, by screws, rivets, nails, or any other means known to those of ordinary skill. In some embodiments, the defining strip 61 is not attached to the fabric portion 62 prior to attaching the hinge portion 60 to the stiff backing member 40, but rather is attached to the stiff backing member 40 simultaneously, using the same bolts, rivets, clinching device, etc. Although in the illustrated embodiment, the stiff backing member 40 extends above the headframe 51, this is merely an exemplary embodiment. The seal member 30 need only be attached to the support 50 in such a manner that a vehicle backing into the dock causes at least some bending (as opposed to swinging) motion. Preferably the bending motion is sufficient such that the seal member 30 creates a protective seal with the surface of the parked vehicle.

FIGS. 3–5 illustrate operation of the wiper seal apparatus 10. As shown in FIG. 3, prior to a vehicle entering the parking area, the seal member 30 is in a pendent, or first position. As a truck backs into the parking area, FIG. 4, the seal member is deflected into its engaged position. Because the stiff backing member 40 prevents the seal member 30 from freely swinging backward toward the warehouse wall, but rather causes the seal member 30 to bend, and also to compress against the top surface of the truck, a protective seal is formed. It will be understood from the teachings herein that the illustrated first and second positions are representative, and that other locations and/or positions for the seal member 30 can be used as the first and second positions without departing from the scope of the invention. By way of example, not limitation, a vehicle having a height different from that shown in FIGS. 4 and 5 may cause the seal member 30 to deflect to a correspondingly different second position, as will a vehicle moved further (or closer) from the warehouse wall. As shown in FIG. 5, as the truck exits the parking area, friction between the seal member 30 and the top of the vehicle applies a force to the seal member 30 in the distal direction. To relieve the pressure developed between the seal member 30 and the vehicle, the seal member 30 pivots vertically and laterally via the hinge portion 60. As is further shown, even though the seal member 30 pivots away from the vehicle, the seal member 30 preferably stays in contact with the top of vehicle substantially until it returns to the first position. When the seal member 30 loses contact with the vehicle, the seal member 30 returns to its lowermost position under the force of gravity.

The many features and advantages of the invention are apparent from the detailed specification, and thus, it is intended by the appended claims to cover all such features and advantages of the invention which fall within the true spirits and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A wiper seal apparatus, comprising:
a hinge portion;
a wall support having an end;
a backing member positioned and retained along the end of the wall support, said backing member having a substantially vertical face; and
a seal member positioned and retained along the backing member, the seal member configured to rest adjacent the vertical face and be pivoted away from the vertical face, wherein said seal member, backing member, and wall support are cooperatively connected in such a manner that the seal member bends when deflected toward the wall support, wherein the hinge portion directly connects the seal member to the backing member, and further wherein the seal member can both pivot about the hinge portion and move vertically at the hinge portion.

2. An apparatus according to claim 1, wherein the hinge portion is removeably fastened to the seal member.

3. An apparatus according to claim 1, wherein the wall support comprises a fabric-covered hood for protection above a dock opening.

4. An apparatus according to claim 1, wherein the wall support is a stationary wall support.

5. An apparatus according to claim 1, wherein the seal member comprises a foam pad.

6. An apparatus according to claim 1, wherein the seal member further comprises at least one drain hole.

7. An apparatus according to claim 1, wherein the backing member is integral with the wall support.

8. An apparatus as according to claim 1, wherein the backing member comprises a metal or wood material.

9. A wiper seal apparatus, comprising:
a hinge portion;
a wall support having an end;
a backing member positioned and retained along the end of the wall support; and
a seal member positioned and retained along the backing member, wherein said seal member, backing member, and wall support are cooperatively connected in such a manner that the seal member bends when deflected toward the wall support, wherein the hinge portion directly connects the seal member to the backing member, and further wherein the seal member can both pivot about the hinge portion and move vertically at the hinge portion, wherein the backing member comprises a wood board embedded into the seal member.

10. A method of manufacturing a wiper seal apparatus, comprising:
providing a hinge portion, and a wall support having an end;
positioning and retaining a backing member along the end of the wall support, said back member having a substantially vertical face;
positioning and retaining a seal member along the backing member, the seal member configured to rest adjacent the vertical face and be pivoted away from the vertical face;
cooperatively connecting the seal member, the backing member, and the wall support in such a manner that the seal member bends when deflected toward the wall support; and
directly connecting the seal member to the backing member via the hinge portion, wherein the seal member can both pivot about the hinge portion and move vertically at the hinge portion.

11. A wiper seal apparatus comprising:
a hinge assembly means;
a wall support means having an end;
a backing member means positioned and retained along the end of the wall support, said backing member having a substantially vertical face;
a seal member means positioned and retained along the backing member means, the seal member means configured to rest adjacent the vertical face and be pivoted away from the vertical face, wherein the seal member means and the backing member means are connected to the wall support means in such a manner that the seal member means bends when deflected toward the wall support, and further wherein the hinge assembly means directly connects the seal member means to the backing member means, wherein the seal member means can both pivot about the hinge assembly means and move vertically at the hinge assembly means.

12. A wiper seal apparatus, comprising:
a hinge portion;
a wall support having an end;
a backing member positioned and retained along the end of the wall support; and
a seal member positioned and retained along the backing member, wherein said seal member, backing member, and wall support are cooperatively connected in such a manner that the seal member bends when deflected toward the wall support, wherein the hinge portion directly connects the seal member to the backing member, wherein the seal member comprises at least a first fabric cover and the hinge portion comprises an extension of said at least first fabric cover, wherein the backing member further comprises an extended portion wherein a portion of the extension of said at least first fabric cover is mounted over a portion of the extended portion of the backing member, wherein the hinge portion further comprises at least one defining strip.

13. An apparatus according to claim 12, wherein the seal member comprises at least a first and a second fabric covering, wherein the second fabric cover is removeably attached to the first fabric cover.

14. An apparatus according to claim 13, wherein the second fabric cover is removeably attached by an attachment means chosen from a hook and loop fastening device, zippers, snaps and buttons.

15. The apparatus of claim 12, wherein the at least one defining strip is located between the extended portion and the at least one first fabric cover.

16. The apparatus of claim 15, wherein the at least one defining strip generally traverses a width of the seal member.

17. A wiper seal apparatus, comprising:
a hinge portion;
a wall support having an end;
a backing member positioned and retained along the end of the wall support said backing member having a substantially vertical face; and
a seal member positioned and retained along the backing member, the seal member comprising a pad and a stiffening member configured to rest adjacent the vertical face and be pivoted away from the vertical face wherein said seal member, backing member, and wall support are cooperatively connected in such a manner that the seal member bends when deflected toward the wall support, wherein the hinge portion directly connects the seal member to the backing member, and further wherein the seal member can both pivot about the hinge portion and move vertically at the hinge portion.

18. A wiper seal apparatus, comprising:
a hinge portion;
a wall support having an end;
a rigid backing member positioned and retained along the end of the wall support, said backing member have a substantially vertical face; and
a seal member positioned and retained along the backing member the seal member comprising a pad and stiffening member encased in at least one fabric cover, wherein said seal member, backing member, and wall support are cooperatively connected in such a manner that the seal member bends when deflected toward the wall support, wherein the hinge portion directly connects the seal member to the backing member, and further wherein the seal member can both pivot about the hinge portion and move vertically at the hinge portion.

* * * * *

UNITED STATES PATENT AND TRADEMARK OFFICE
CERTIFICATE OF CORRECTION

PATENT NO. : 7,044,474 B2 Page 1 of 1
APPLICATION NO. : 10/270547
DATED : May 16, 2006
INVENTOR(S) : William C. Eungard It is certified that error appears in the above-identified patent and that said Letters Patent is hereby corrected as shown below:

Column 9
Line 20, please insert --,-- after "support";

Column 10
Line 15, please insert --,-- after "member" (first occurrence).

Signed and Sealed this

Eighth Day of August, 2006

JON W. DUDAS
*Director of the United States Patent and Trademark Office*